(12) United States Patent
Crockett et al.

(10) Patent No.: US 7,447,301 B2
(45) Date of Patent: Nov. 4, 2008

(54) TOLL-FREE NUMBER BLOCKING OVERRIDE INDICATOR

(75) Inventors: Susanne M. Crockett, Buffalo Grove, IL (US); William H. Allen, Pleasanton, CA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1077 days.

(21) Appl. No.: 10/423,004

(22) Filed: Apr. 25, 2003

(65) Prior Publication Data

US 2004/0213392 A1  Oct. 28, 2004

(51) Int. Cl.
H04M 3/00 (2006.01)

(52) U.S. Cl. .................. 379/196; 379/197; 379/198; 379/200

(58) Field of Classification Search .......... 379/196, 379/197, 198, 200
See application file for complete search history.

(56) References Cited

U.S. PATENT DOCUMENTS

| | | | |
|---|---|---|---|
| 5,610,915 | A | 3/1997 | Elliott et al. |
| 5,802,157 | A * | 9/1998 | Clarke et al. ............ 379/196 |
| 5,825,769 | A | 10/1998 | O'Reilly et al. |
| 5,884,193 | A * | 3/1999 | Kaplan .................. 455/565 |
| 5,958,016 | A | 9/1999 | Chang et al. |
| 6,032,184 | A | 2/2000 | Cogger et al. |
| 6,104,799 | A | 8/2000 | Jain et al. |
| 6,115,040 | A | 9/2000 | Bladow et al. |
| 6,141,777 | A | 10/2000 | Cutrell et al. |
| 6,161,128 | A | 12/2000 | Smyk |
| 6,377,993 | B1 | 4/2002 | Brandt et al. |
| 6,381,644 | B2 | 4/2002 | Munguia et al. |
| 6,445,694 | B1 | 9/2002 | Swartz |
| 6,456,706 | B1 * | 9/2002 | Blood et al. ............ 379/188 |
| 6,463,145 | B1 | 10/2002 | O'Neal et al. |
| 6,470,386 | B1 | 10/2002 | Comber et al. |
| 6,473,407 | B1 | 10/2002 | Ditmer et al. |
| 6,490,620 | B1 | 12/2002 | Ditmer et al. |

(Continued)

FOREIGN PATENT DOCUMENTS

WO    99/16230    4/1999

(Continued)

OTHER PUBLICATIONS

Kramer Convergence Communications, Mar. 5, 2001.*

*Primary Examiner*—Quynh H Nguyen
(74) *Attorney, Agent, or Firm*—Greenblum & Bernstein, P.L.C.

(57) ABSTRACT

A menu routing service routes calls made to a customer's toll-free number according to customized routing instructions. A service provider establishes service parameters, which include the toll-free number and a restriction associated with at least one of the customer and the service provider. To customize call routing, a web server receives instructions from the customer to associate the toll-free number with a terminating number, such as a directory number or switch ID and trunk group numbers. When the restriction prohibits the association, the web server determines whether the service parameters further include an override indicator associated with the customer that overrides the restriction. The toll-free number is associated with the terminating number when service parameters include the override indicator. The override indicator may be an affiliate indicator, which enables the customer to terminate inter-LATA calls in a region in which the service provided is prohibited from providing long distance service.

24 Claims, 4 Drawing Sheets

U.S. PATENT DOCUMENTS

| | | |
|---|---|---|
| 6,515,968 B1 | 2/2003 | Comber et al. |
| 6,529,596 B1 | 3/2003 | Asprey et al. |
| 6,574,661 B1 | 6/2003 | Delano et al. |
| 6,804,536 B1 * | 10/2004 | Bultman ..................... 455/557 |
| 6,920,214 B1 * | 7/2005 | Sbisa et al. ............ 379/221.08 |
| 2002/0054587 A1 | 5/2002 | Baker et al. |
| 2003/0112943 A1 * | 6/2003 | Kamil ....................... 379/200 |

FOREIGN PATENT DOCUMENTS

| | | |
|---|---|---|
| WO | 99/20058 | 4/1999 |

* cited by examiner

TOLL-FREE NUMBER BLOCKING OVERRIDE INDICATOR

BACKGROUND OF THE INVENTION

1. Field of the Invention

The present invention relates to the field of telecommunications. More particularly, the present invention relates to routing calls, placed to a toll-free telephone number, pursuant to a customized menu routing service.

2. Acronyms

The written description contains acronyms that refer to various telecommunications services, components and techniques, as well as features relating to the present invention. Although some of these acronyms are known, use of these acronyms is not strictly standardized in the art. For purposes of the written description, the acronyms are defined as follows:
Advanced Intelligent Network (AIN)
Automatic Number Identification (ANI)
Carrier Identification Code (CIC)
Customized Menu Routing (CMR)
Dialed Number Identification Service (DNIS)
Dual Tone Multi-Frequency (DTMF)
Electronic Key Telephone System (EKTS)
Extensible Markup Language (XML)
Federal Communications Commission (FCC)
HyperText Markup Language (HTML)
HyperText Transfer Language Protocol (HTTP)
Interactive Voice Response (IVR)
Local Access and Transport Area (LATA)
Local Exchange Carrier (LEC)
Numbering Plan Area (NPA)
Plain Old Telephone Service (POTS)
Public Switched Telephone Network (PSTN)
Regional Bell Operating Company (RBOC)
Service Control Point (SCP)
Service Management System (SMS)
Service Switching Point (SSP)
Signaling System 7 (SS7)
Signaling Transfer Point (STP)
Transmission Control Protocol/Internet Protocol (TCP/IP)
Transaction Capabilities Application Part (TCAP)
Uniform Resource Locator (URL)

3. Background Information

Customer involvement in building and managing call services has increased since the availability of intelligent network services, such as advanced intelligent network (AIN) services. Customers of services involving toll-free numbers, such as 800 and 888 numbers, likewise have a need to build and manage their portfolio of toll-free numbers to efficiently handle incoming calls. However, toll-free number customers are subject to numerous restrictions, some of which are not apparent due to the nature of toll-free numbers and their associated terminating directory numbers, such as plain old telephone service (POTS) numbers.

For example, a customer may contract with a toll-free number service provider for service in a limited number of states. However, when the customer builds its toll-free service, it may attempt to associate a toll-free number with a directory number in a state or region for which it has not contracted. This would result in calls being blocked when termination is attempted within the unauthorized state or region, causing frustration to the customer, as well as the customer's clientele. On the other hand, a customer may fall within an exception to a general call blocking rule, but not take advantage of the exception because either it does not know of the exception or the network does not properly implement the exception (e.g., the customized service was not built properly).

Call blocking and other limitations (as well as exceptions to the limitations) may result from regulatory parameters that may not be well known to the general public, including the customers. For example, in 1983, the Bell System was disbanded into a number of regional Bell Operating Companies (RBOCs), based on a divestiture agreement between the Federal Government and AT&T. Since that time, numerous regulatory precautions have been enacted to prevent unfair competition by the RBOCs against competitors entering the marketplace. One precaution prohibited RBOCs from offering long distance services to their own local customers, although the RBOCs were free to offer long distance service to customers outside their local service areas.

The Telecommunications Act of 1996 provided limited relief, however, entitling the RBOCs to enter the long distance market in their own localities under certain circumstances. For example, in order for the Federal Communications Commission (FCC) to grant a RBOC permission to offer in-region inter-LATA (local access and transport area) services, the RBOC must complete a competitive checklist, including the following: (i) there must be an agreement with an existing competitor for the RBOC's local service, or (ii) if no competitor has come forward, there must be a statement indicating that the RBOC is ready to provide access and interconnection for potential competitors in the local market. Access and interconnection is generally defined to include, for example, access to RBOC poles, conduits and rights-of-way, number portability, dialing parity, reciprocal compensation arrangements and availability for resale. In other words, the FCC regulations do not allow a RBOC to enter the long distance market in their own locality, unless there is evidence of a viable, independent competitor in the local market, or the RBOC has committed to terms and conditions under which it is ready and willing to offer the components of the competitive checklist.

As an additional safeguard, Section 272 of the Telecommunications Act of 1996 requires RBOCs to use separate affiliates to offer their local customers long-distance services, including, for example, long-distance telephone, telecommunications, and information services. To constitute a separate affiliate, an entity must meet certain requirements of the Telecommunications Act of 1996, establishing a minimum threshold of operational and business independence.

Therefore, when a customer of a RBOC associates a POTS number in the RBOC's local service area with a toll-free number acquired from the RBOC, calls to that toll-free number will be blocked upon attempted termination to the POTS number, for example, based on the numbering plan area (NPA) and exchange (NXX). When the customer is classified as a separate affiliate, then it falls within the exception and the blocking can be overridden to terminate toll-free calls to the local POTS number. However, enabling the customer to control and manage its toll-free services presents difficulties in implementing and maintaining the proper blocking and blocking override criteria. Therefore, such blocking and overriding parameters are not included in conventional customer managed toll-free number services.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

The present invention relates to enabling telecommunication customers to efficiently manage and control their telecommunication assets. More particularly, customers are provided a customized menu routing (CMR) service for managing their portfolios of toll-free telephone numbers. The network service provider (e.g., a RBOC) imposes limits on the extent and scope of the toll-free numbers and associated services of each customer, based on, for example, the type of service and associated geographic regions to which the customer subscribes and various regulatory restrictions. The customer may then customize the routing of calls to their respective toll-free numbers within the limits imposed by the service provider, including building call trees and crafting voice announcements.

An example of a regulatory restriction that limits the customers' routing options is Section 272 of the Telecommunications Act of 1996, discussed above. Section 272 generally requires that a RBOC's in-region, inter-LATA services be provided through a separate affiliate and sets forth the requirements for qualification as an affiliate. Therefore, a customer is blocked from terminating calls to its toll-free number at a location within the RBOC's local area, unless the customer has been predetermined to qualify as a separate affiliate. Accordingly, the customer is barred from entering a blocked number (e.g., a POTS directory number, a switch identification (ID) number and/or a trunk group number) as the terminating number associated with the customer's toll-free number, unless the customer's CMR account includes a blocking override indicator (i e., an affiliate indicator).

In view of the above, the present invention through one or more of its various aspects and/or embodiments is presented to accomplish one or more objectives and advantages, such as those noted below.

An aspect of the present invention provides a system for operating a routing service that includes a toll-free number of a customer. The system includes a platform that implements the routing service based on service data and a server that communicates with the platform through a network. The service data identifies a restriction associated with at least one of a service provider and the customer. The server receives at least a portion of the service data from the platform, as well as an instruction from the customer relating to implementation of the routing service, and provides the instruction to the platform. The server may receive the instruction from the customer through a packet switched data network, such as the Internet, connectable to a web client of the customer.

The instruction associates the toll-free number with a terminating number to which calls to the toll-free number are to be routed. The server will not follow the instruction to associate the toll-free number with the terminating number when the terminating number is associated with the restriction, unless the service data further includes an override indicator that overrides the restriction. The restriction may identify at least one geographic area in which the customer is not authorized to receive calls to the toll-free number. For example, the geographic area may be outside a service area to which the customer subscribes. The restriction may include a limitation on the service provider, for example, under Section 272 of the Telecommunications Act of 1996, associated with the at least one geographic area. The override indicator indicates relief from Section 272 with respect to the customer, based, for example, on the customer's status as an affiliate of a Bell Operating Company. The override indicator may indicate an exception to the restriction identifying the at least one geographic area.

The system may further include a service control point (SCP) connected to the platform. The SCP provides instructions to route calls to the toll-free number, through a public switched telephone network (PSTN), in accordance with the service data. The terminating number may be a POTS number or at least one of a switch identification number and a trunk group number.

Another aspect of the present invention provides a method for managing a call routing service, including predetermined service parameters relating to a customer, in which the service parameters include at least a toll-free number of the customer and a restriction associated with at least one of the customer and a service provider. The method includes receiving instructions from the customer to associate the toll-free number with a terminating number. The instructions are received, for example, from the customer through a packet switched data network, such as the Internet. The terminating number is a POTS directory number and/or at least one of a switch identification number and a trunk group number. When the restriction prohibits the association between the toll-free number and the terminating number, it is determined whether the service parameters further include an override indicator associated with the customer that overrides the restriction. The toll-free number is associated with the terminating number when service parameters include the override indicator. The toll-free number and the associated terminating number may be communicated to a processor in the PSTN to enable the routing of calls placed to the toll-free number to the terminating number.

The restriction may identify at least one geographic area in which the customer is not authorized to terminate calls. For example, the geographic area may be outside a service area to which the customer subscribes, in which case the override indicator indicates an exception to the restriction identifying the geographic area. The geographic area may be associated with a limitation under Section 272, in which case the override indicator may indicate relief from the Section 272 limitation with respect to the customer. The relief is based, for example, on the customer's status as an affiliate of a RBOC.

Yet another aspect of the present invention provides a method for managing a call routing service, including a toll-free number of a customer. The method includes receiving predetermined service data associated with the customer from a provider. The service data includes at least the toll-free number and a restriction associated with at least one of the customer and the provider. Instructions are received from the customer, via a packet switched data network, to associate the toll-free number with a terminating number. It is determined whether the restriction prohibits the association between the toll-free number and the terminating number. When the restriction prohibits the association, it is further determined whether the service data includes an override indication, associated with the customer, that overrides the restriction. When the service data does not include the override indication, the instructions from the customer are rejected. When the service data includes the override indication, a processor in a telecommunications network is instructed to route calls to the toll-free number to the terminating number. The restriction includes, for example, a limitation on terminating calls to a geographic area associated with the terminating number under Section 272 of the Telecommunications Act of 1996, in which case the override indicator may identify the customer as an affiliate of a RBOC.

The various aspects and embodiments of the present invention are described in detail below.

Figure 1:
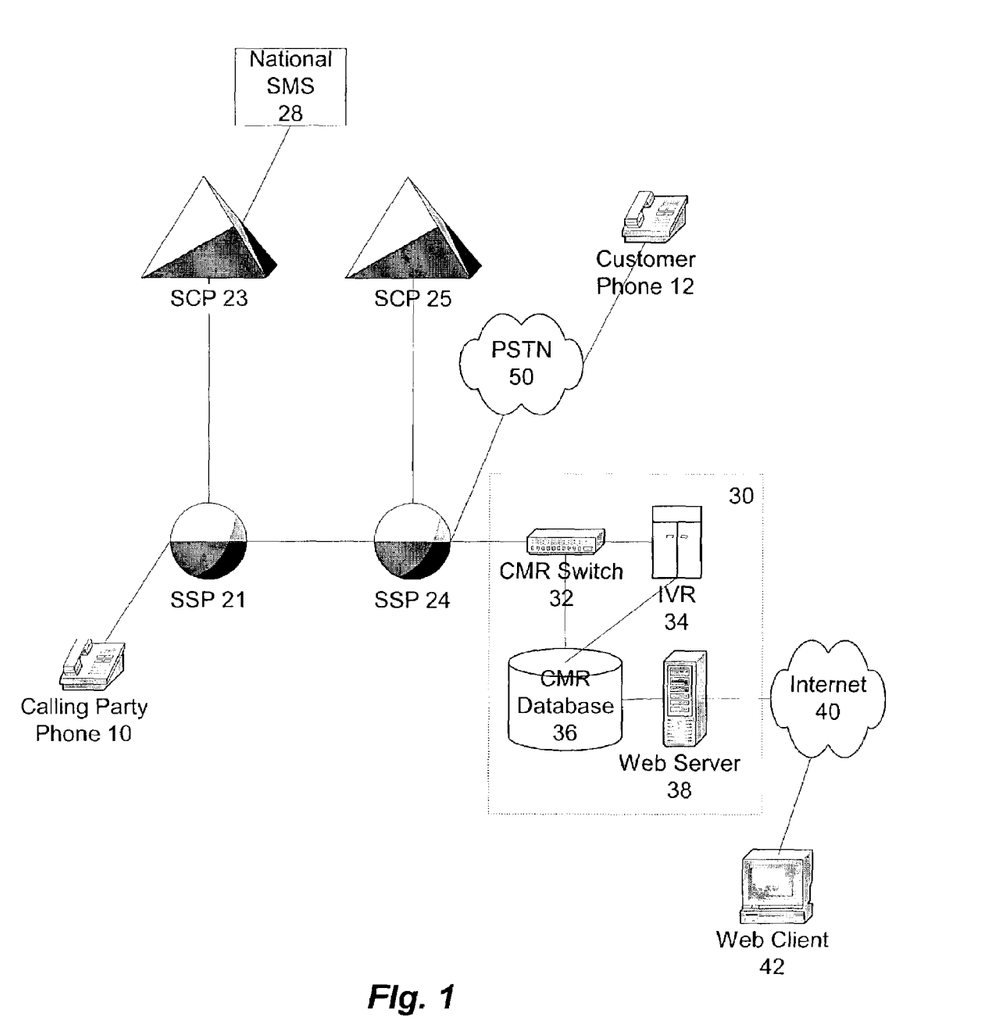
FIG. 1 is a block diagram showing an exemplary telecommunications network, according to an aspect of the present invention.

FIG. 1 illustrates an exemplary telecommunications network of the present invention. The telecommunications network includes a public switched telephone network (PSTN), including a local exchange carrier (LEC) service switching point (SSP) 21, a regional SSP 24, a calling party telephone 10 and a customer telephone 12. Both the calling party telephone 10 and the customer telephone 12 may be any type of PSTN compatible telephone, including POTS telephone, or telephones in a Centrex system, a PBX system or an electronic key telephone system (EKTS). The calling party telephone 10 is also dual tone multiple frequency (DTMF) capable, although such functionality is not necessary. In an alternative embodiment, the calling party telephone 10 may be a wireless telephone, in which case the call would access the PSTN through well-known interfacing techniques between the wireless network in which the call originates and the telecommunications network depicted in FIG. 1.

The customer telephone 12 has an associated POTS directory number, to which calls to the customer's toll-free number are terminated. More particularly, the customer associates each toll-free number with at least one corresponding POTS directory number, such as the number associated with the customer telephone 12, through a web server 38, discussed below. In an embodiment of the invention, the customer associates each toll-free number with another number that adequately identifies a resource to which the customer's toll-free number may be terminated, such as a switch ID and/or trunk group number, either in lieu of or in addition to the POTS directory number. For example, when the customer desires dedicated trunk groups for handling calls to its toll-free number, as opposed to simply directing the incoming calls to various POTS directory numbers, the switch ID and the trunk group number for each dedicated trunk group are associated with the toll-free number.

Although FIG. 1 depicts a single customer telephone 12, it is understood that the customer may have any number of telephones (represented by the costumer telephone 12), without departing from the spirit and scope of the present invention. For example, when the customer has a Centrex system, incoming calls may be directed to a common number or to any one of numerous extensions. It is further understood that, in an embodiment of the invention, the customer telephone 12 represents multiple telephones or telephone systems, with different associated POTS numbers, at different geographic locations.

The SSP 21 is an end office switch servicing the calling party telephone 10. The SSP 24 is an interexchange switch, which services telephones of numerous customers, although only the exemplary customer telephone 12 is depicted in FIG. 1. The connection between the SSP 24 and the customer telephone 12 may be direct or may pass through a number of intervening switches, generally represented by the PSTN 50 in FIG. 1, without departing from the spirit and scope of the present invention. The SSP 21 and the SSP 24 may be any switch compatible with the PSTN and may include, for example, 1AESS or 5ESS switches manufactured by Lucent Technologies, Inc. (Lucent); DMS-100, DMS-200 or DMS-250 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN protocol or a Carrier AIN (CAIN) protocol. However, embodiments of the present invention may include switches, such as ATM and soft switches, that are incorporated into any alternative telecommunications technology.

The telecommunications network of FIG. 1 further includes a LEC service control point (SCP) 23 and a regional SCP 25, having Service Builder intelligence, for example. Each of the SCPs 23 and 25 includes a corresponding database (not pictured) containing information relating to various intelligent network services and routing calls. The SCP 23 is connected to the national service management system (SMS) 28, which contains a database correlating the toll-free numbers in North America with service providers and/or carriers. The SCP 23 communicates with the SSP 21 through a signaling transfer point (STP) (not pictured), using well known out-of-band signaling, such as signaling system 7 (SS7) signaling. The SCP 23 receives queries from the SSP 21, based on preset triggers, and provides instructions relating to call routing and service implementation in response. The SCP 25 similarly communicates with the SSP 24 through an STP (not pictured) using SS7 signaling, for example. The SSP 24 queries the SCP 25 in response to a trigger associated with its receipt of the toll-free number from the SSP 21.

By way of example, the SCP 23 and the SCP 25 are implemented with Telcordia Integrated Service Control Points, loaded with ISCP software, available from Telcordia, Murray Hill, N.J. In alternative embodiments, each of the SCP 23 and the SCP 25 may be any make and model of SCP, including, for example, Lucent Advantage, Nortel Service Builder, and Compagnie Financière Alcatel (Alcatel) Infusion. The call flow logic of the present invention may be upgraded to accommodate future AIN releases and protocols, without departing from the spirit and scope of the present invention.

The telecommunications network of FIG. 1 further includes a network associated with the CMR service, connected through a packet switched data network, such as the public Internet 40, to an exemplary web client 42. The network provides a CMR platform 30, which includes a CMR switch 32, an IVR 34, a CMR database server 36 and a web server 38. The CMR switch 32 may be, for example, a VCO/4K open programmable switch available from Cisco Systems, Inc. The IVR 34 is depicted separately from the CMR switch 32, although the functionality of the IVR 34 may be included in the CMR switch 32 in an alternative embodiment. The CMR database server 36 is, for example, a Stratus database server, although any compatible database and processor combination with comparable functionality and capability may be used. It is understood that the CMR platform 30 may include any compatible elements with comparable functionality and capability as those depicted in FIG. 1 without departing from the spirit and scope of the present invention.

As previously stated, the web server 38 is connected to a web client 42 through the Internet 40. The web client 42 includes a graphical user interface that incorporates a web browser, such as Microsoft Internet Explorer, available from Microsoft Corporation, or Netscape Navigator, available from Netscape Communications Corporation. In one embodiment, the web client 42 is implemented with an IBM Pentium based PC, running the Linux operating system, available from, for example, Free Software Foundation, Inc., or the Microsoft Windows operating system, and running web browser software, such as Microsoft Internet Explorer, Netscape Navigator or HotJava, available from Sun Microsystems, Inc. An embodiment of the invention includes the web server 38 running the Linux or Microsoft Windows operating system and the Apache web server software, available from the Apache Software Foundation, or the Jigsaw web server software, available from World Wide Web Consortium (W3C). In alternative embodiments, the web server 38 interfaces with the web client 42 through a private intranet or other packet switched data network.

Figure 2:
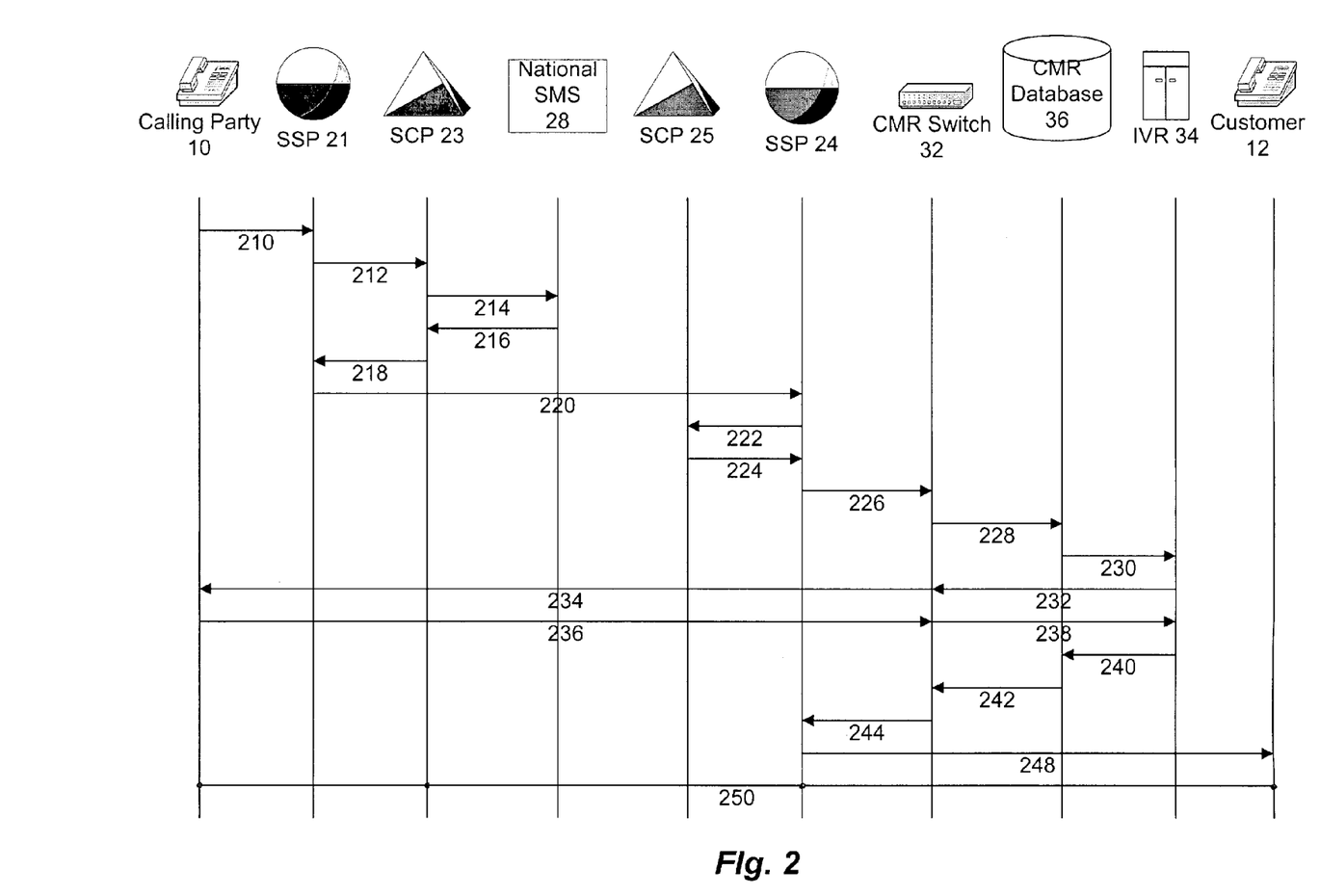
FIG. 2 is an exemplary call flow diagram showing routing of a telephone call to a terminating directory number, based on a toll-free number of a customer, according to an aspect of the present invention.

FIG. 2 is an exemplary call flow diagram depicting the general interaction among the network elements in response to a call to a CMR customer. At step 210, a calling party initiates a call to a toll-free number (e.g., an 800 number, an 888 number or the like) at the calling party telephone 10. The calling party's originating end office, the SSP 21, recognizes the dialed digits as a toll-free number. The SSP 21 accordingly suspends the call and launches a toll-free number trigger, querying the SCP 23 at step 212, for routing instructions. In an embodiment, the trigger and associated query are in a known AIN format for SS7 signaling, such as an 800 number trigger.

At step 214, the SCP 23 queries the national SMS 28 to determine the ownership of the toll-free number identified in the query from the SSP 21. Typically, the SMS 28 returns toll-free number data, including a carrier identification code (CIC) associated with the toll-free number, at step 216. The SCP 23 can then determine, for example, whether the carrier is a local or a long distance carrier. Alternatively, the SMS 28 periodically updates the SCP 23 with toll-free number data, including the toll-free number called by the calling party. Accordingly, the SCP 23 does not query the national SMS 28 at step 214, but rather retrieves the toll-free number data from its previously updated database. Regardless, the SCP 23 forwards the toll-free number data to the SSP 21 at step 218, along with instructions to route the call to the SSP 24, using trunk groups of the carrier identified by the CIC.

At step 220, the SSP 21 forwards the call to the SSP 24, which launches an AIN trigger, such as a shared inter-office trunk trigger, querying the SCP 25 at step 222 based on the toll-free number. The SCP 25 performs a look-up of the toll-free number, associates the number with CMR services and identifies the CMR switch 32 and/or the associated trunk group of the CMR platform 30. The SCP 25 instructs the SSP 24 to route the call to the switch 32 at step 224, which the SSP 24 does at step 226. The SSP 24 routes the call using known out-of-band signaling, including, for example, an SS7 initial address message.

The switch 32 suspends the call and contacts the database server 36 at step 228, which determines the CMR application based on the dialed number identification service (DNIS) data associated with the call. For example, the database server 36 accesses a customer account associated with the toll-free number and determines the customized routing instructions created by the customer for handling calls to the toll-free number.

Depending on the customized routing instructions, the database server 36 may determine that the caller must enter data in order to complete the call processing. For example, when the customer selects authorization code dependent routing, discussed below, the caller is required to enter a valid authorization code in response to voice prompting in order to complete the call. Likewise, in an exemplary form of call origin dependent routing, also discussed below, the caller enters his or her zip code in response to voice prompts in order for the database server 36 to route the call to the appropriate number.

When caller entered data is required, the database server 36 contacts the IVR 34 at step 230 to initiate the voice prompts designed to elicit the necessary information from the caller. In an embodiment of the invention, the voice prompts and associated scripts are designed and built by the customer at the web client 42 and the web server 38, as discussed below. The voice prompts may be synthesized by the IVR 34 or prerecorded by the customer.

At steps 232 and 234, the IVR 34 plays the scripted voice announcements and prompts to the calling party telephone 10 through the CMR switch 32. For example, the IVR 34 may prompt the caller to enter an authorization code, a call origination zip code, or some other menu of options customized to the customer's service. For example, the IVR 34 may announce an introductory welcome message and subsequently prompt the caller to "enter one to reach our sales department; two to reach our billing department; three to check the status of an order; or four for assistance." The caller enters the response to the voice prompting at steps 236 and 238 using the key pad of the DTMF telephone. In an embodiment of the invention, the IVR 34 includes voice recognition capability, enabling the caller to speak responses to the voice prompts. Depending on the customization of the customer's CMR service, as well as the caller's initial responses, the IVR 34 may provide additional voice prompts to collect additional data from the caller, as needed.

At step 240, the IVR 34 provides the data collected from the caller to the CMR database server 36 for processing. Based on the data, the CMR database server 36 determines the destination of the call, such as the POTS directory number or the switch ID and trunk group number to which the call made to the toll-free number is to be terminated. Determining the switch ID and trunk group number is more appropriate, for example, when the customer has a Centrex or PBX system that distributes incoming calls to numerous terminals.

When the database server 36 initially determines that the toll-free number does not require any interaction with the IVR 34, the database server 36 identifies the POTS directory number and/or the switch ID and trunk group number at which the call is to be terminated without interacting with the caller. Again, the processing depends on the customized instructions previously provided to the CMR platform 30 by the customer through the web server 38. For example, when the customer selects a time of day routing function, the database server 36 determines the call destination based on the current time. When the customer selects percentage allocation routing, the database server 36 determines the call destination based on the number of calls received and the percentage of calls already directed to alternative destinations.

The database server 36 passes the call routing information to the CMR switch 32 at step 242. At step 244, the CMR switch 32 forwards the call routing information to the SSP 24 and releases the trunk between the CMR switch 32 and the SSP 24 via release link transfer. The SSP 24 continues processing the call using the newly acquired destination information. In particular, the SSP 24 routes the call to the customer telephone 12, through the PSTN 50, at step 248. A final connection is established between the calling party telephone 10 and the customer telephone 12, through the SSP 21 and the SSP 24, as indicated by step 250.

Depending on the customized service, the SSP 24 retains control of the call until completion. For example, when the customer selects busy-ring no answer functionality for the toll-free number, discussed below, the CMR database server 36 identifies an initial destination, along with at least one alternative destination, which are communicated to the SSP 24 by way of the CMR switch 32. When the initial destination is busy (or not answered after a predetermined number of rings), the SSP 24 attempts termination to the alternative destination.

Prior to processing the call as depicted in FIG. 2, the CMR platform must be programmed to implement the customer's toll-free number plan. The programming includes two general stages. First, the service provider's administrator establishes the overall parameters for the CMR service, as well as for the particular customers. The administrator obtains the CMR service data by accessing the web server 38 over the Internet 40, using the web client 42. For example, the administrator identifies the toll-free numbers purchased by the customer, as well as the customer's associated switch ID numbers and trunk group numbers, if any. For example, a large customer may require installation of the dedicated trunk group to accommodate calls to the directory numbers associated with the toll-free numbers. This dedicated trunk group is programmed into the CMR service, so that the customer does not have the ability to access other trunk groups. In an embodiment, even smaller customers are assigned specific switch ID numbers and trunk group numbers, through which the customers can route calls. The switch ID numbers and trunk group numbers may be used to populate drop-down lists, enabling the customer to review and select the numbers for directing the routing of the various toll-free numbers.

The administrator also identifies the states or regions in which the customer may terminate calls, based on regulatory restrictions, contractual limitations and the like. In an embodiment of the invention, all customers are automatically entitled to terminate calls in the same regions, by default, unless otherwise indicated by the administrator. For example, as discussed above, regulations prohibit customers of a regional RBOC to terminate long distance calls in those states for which the regional RBOC provides local service (except to the extent the regional RBOC has obtained relief). Therefore, the CMR service would be programmed to prohibit associating toll-free numbers with POTS directory numbers located in the barred states, for example, based on the NPA/ NXX of the POTS directory number. However, the administrator provides an indication for each customer exempt from the regulations governing the RBOCs with respect to the provision of long distance services, including customers that qualify as separate affiliates, discussed above.

The second stage of programming is performed by the customer within the parameters set by the administrator. The customer programming is likewise performed at the web server 38, which the customer accesses through the Internet 40, using any Internet compatible device. The customer essentially customizes its CMR service by specifying various elements relating to handling and routing calls to the customer's toll-free number. For example, in an embodiment of the invention, the customer is able to associate its toll-free numbers with POTS directory numbers and/or switch ID and trunk group numbers, specify the types of routing and build call trees, voice menus and announcements.

Figure 3:
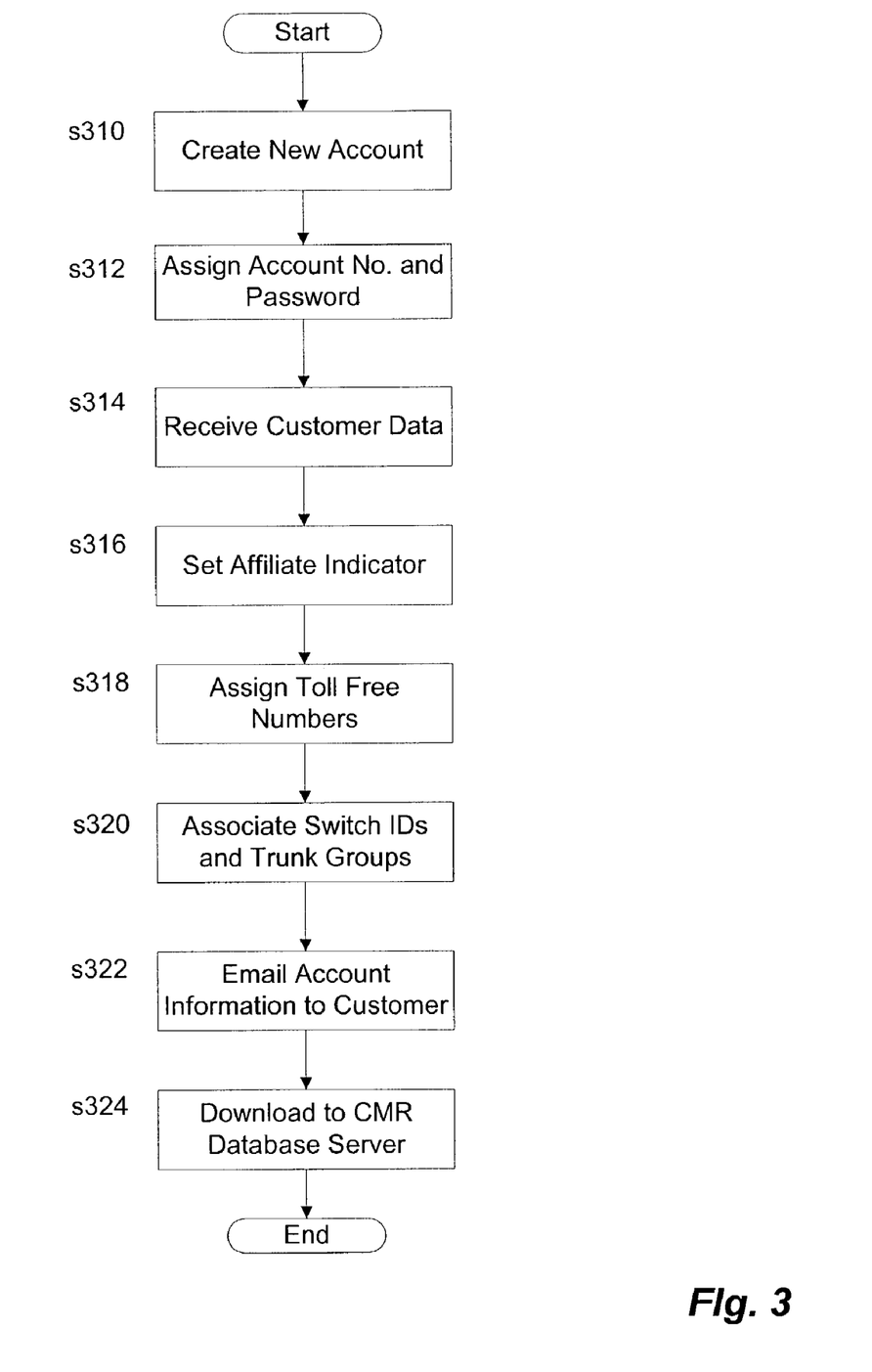
FIG. 3 is a flowchart of exemplary network platform service logic for creating a customer account, according to an aspect of the present invention.

FIG. 3 is a flowchart of exemplary service logic of the web server 38 for creating a customer account at the CMR platform 30. In an embodiment of the invention, the service logic is executed by the web server 38. The web server 38 is accessed by the administrator from the web client 42 over the Internet 40. The connection with the web server 38 may be a well known socket connection over transmission control protocol/Internet protocol (TCP/IP), for example, using HyperText Transfer Language Protocol (HTTP). The web server 38 is identified through an associated uniform resource locator (URL), receives HTTP requests from the web client 42 over the Internet 40 and serves HyperText Markup Language (HTML) or Extensible Markup Language (XML) documents in response.

The information received by the web server 38 is responsive to prompting by the web server 38, which is programmed in a form reasonably calculated to elicit the desired information. For example, the web server 38 may display a table or form having blank fields that the administrator fills in based on the identity of each field. Alternatively, the web server 38 may be programmed to request information through discrete fields consecutively displayed in a succession of web pages.

After authenticating the administrator, the web server 38 receives instructions to create a new customer account at step s310. The web server 38 determines and assigns a new customer account number and associated password at step s312. At step s314, the web server 38 receives descriptive information relating to the customer. For example, the customer's name, billing address, telephone numbers and the like are entered. In an embodiment of the invention, this information has been previously provided to the administrator after the service provider contracts with the customer to provide the CMR services.

At step s316, the web server 38 receives information regarding the customer's status as a RBOC affiliate. As discussed above, a customer must meet certain criteria in order to operate as an affiliate. The criteria focus on the customer's relationship with the parent RBOC, including for example, operating independently, keeping separate books and records, employing separate officers, directors and employees, and maintaining arm's length transactions. When the customer is an affiliate, the web server 38 receives instructions to set a blocking override indicator (e.g., an affiliate indicator), which is stored in association with the customer's account number. For example, an affiliate indicator field may be populated with the appropriate data indicating the affiliate status, such as a "1", a check mark, the word "yes" or the like. In alternative embodiments, blocking bypass indicators are available to override blocking limitations otherwise established with respect to the customers. For example, the service provider may not provide service in certain areas based on a standard contract with customers. The blocking bypass indicator may then be set for those customers who purchase an upgraded or expanded service that includes the otherwise blocked areas.

The toll-free numbers assigned to the customer are entered at step s318. The contractual terms between the toll-free service provider and the customer dictates the number of toll-free numbers to which the customer is entitled and, in some instances, the specific numbers themselves. For example, the customer may wish to have a number that spells a particular word relating to the name or type of business.

At step s320, the web server 38 receives data indicating the switch ID and trunk group numbers (if any) that are set aside for use by the customer. In an embodiment of the invention, the switch ID and trunk group numbers designate dedicated trunk groups that are installed and/or reserved to specifically accommodate the customer's toll-free number service. The switch ID and trunk group numbers are determined based on the location of the customer's telephone terminals, such as, for example, the location of the customer's call service center. When the customer only wants the ability to associate toll-free numbers with POTS directory numbers, there is no need for the administrator to identify the switch ID and trunk group numbers.

Once the basic parameters of the toll-free service have been established, a summary of the parameters is emailed from the web server 38 to the customer via the Internet 40, according to an embodiment of the invention, at step s322. The contents of the email may vary without affecting the spirit and scope of the present invention. At a minimum, however, the customer receives an account number and associated password, so that the customer can access the web server 38 to review the other parameters associated with the service. The customer may be notified of the account parameters by any effective form of communication without departing from the spirit and scope of the present invention.

At step s324, the web server 38 downloads the toll-free service parameters to the CMR database server 36. The information is transmitted using a known data signaling, such as TCP/IP signaling, transaction capabilities application part (TCAP) over TCP/IP signaling, session initiation protocol (SIP) signaling, and/or HTTP signaling. The CMR database server 36 does not download the service parameters to the SCP 25. The SCP 25 stores data indicating the toll-free numbers associated with the CMR platform 30, but does not need to store data on the individual customers. When the SCP 25 receives a query indicating a toll-free number associated with the CMR platform 30, it simply instructs the SSP 24 to route the call to the CMR platform 30, as discussed with respect to steps 222 and 224 of FIG. 2. The CMR platform 30 processes the call to provide additional routing instructions for call termination.

Figure 4:
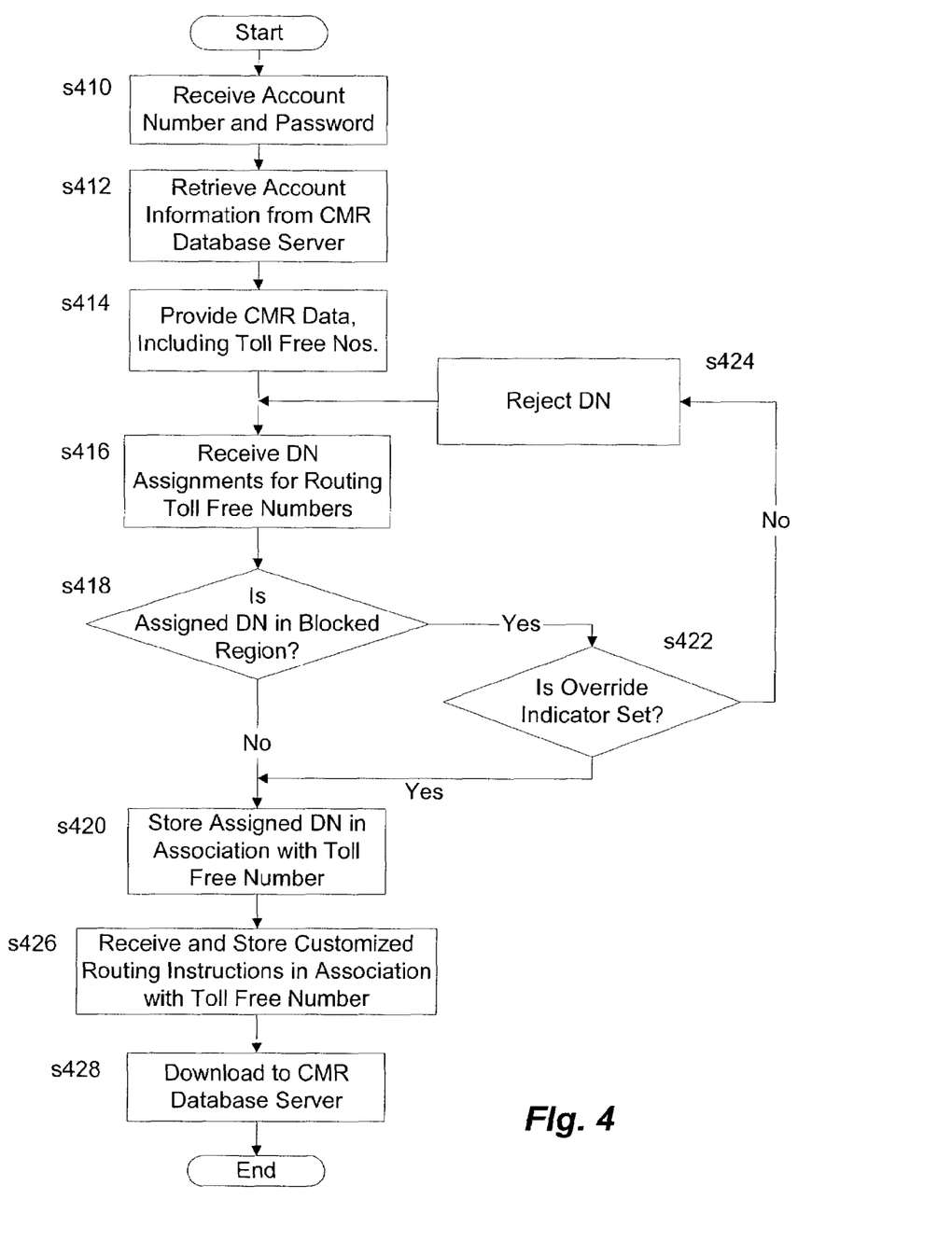
FIG. 4 is a flowchart of exemplary network platform service logic for customizing the customer account, according to an aspect of the present invention.

FIG. 4 is a flowchart of exemplary service logic of the web server 38 for customizing the customer's toll-free service according to instructions from the customer, within the parameters previously established by the administrator. Initially, the customer receives the account number and password information by email from the web server 38. As stated above, the email may contain additional basic information, such as the name and address of the customer and the toll-free numbers for which it has contracted.

The customer accesses the web server 38 over the Internet 40 from a web client 42, which is any Internet compatible terminal, such as a PC, using the URL of the web server 38. In response to prompting, the web server 38 receives the account number and password information from the customer at step s410. In an embodiment of the invention, the email received by the customer includes the URL of the web server 38 in a link, so that the customer may access the web server 38 by simply opening the link in the email. The customer may change its password after initially accessing the CMR service.

At step s412, the web server 38 retrieves the CMR data related to the customer's CMR account from the CMR database server 36. The web server 38 provides the data to the customer at step s414. The data necessarily includes the toll-free numbers that have been assigned to the customer. The format in which the data is provided to the customer is not limited. For example, the data may be presented all at once, in summary form, or the data may be presented in segments on various web pages in response to specific requests by the customer. Regardless, the customer is ultimately presented with a listing of the available toll-free numbers.

In an embodiment of the invention, the web server 38 receives the POTS numbers respectively associated with the toll-free numbers at step s416. For example, each of the toll-free numbers may include an adjacent field in which the customer enters a 10 digit directory number to which calls to that toll-free number will terminate. As discussed above, although FIG. 4 is described with respect to POTS directory numbers being associated with toll-free numbers for purposes of enhancing clarity, it is understood that the CMR service may be based on associating any numbers adequately identifying resources to which calls may be routed, such as switch ID numbers and/or trunk group numbers, with the toll-free numbers without departing from the spirit and scope of the present invention.

At step s418, the web server 38 determines whether the POTS directory number entered by the customer is in a region in which calls to that number would be blocked. For example, when the service provider is a RBOC (without Section 272 relief), directory numbers within the RBOC's local area are blocked from receiving long distance calls, even when the call originated as a toll-free call. When calls to the entered directory number would not be blocked, the web server 38 stores the POTS directory number in association with the toll-free number in the customer's CMR account at step s420.

When calls to the selected directory number would be blocked, the web server 38 determines whether the blocking override indicator has been set with respect to the customer at step s422. For example, when blocking occurs because the customer attempts to associate a number in a local area of a RBOC, the web server 38 determines whether an affiliate indicator has been set for the customer at step s422. In other words, the web server 38 determines whether the customer has been designated a separate affiliate of the RBOC, such that the customer may receive long distance calls in an otherwise proscribed region.

When no override indicator has been set, the POTS directory number is rejected by the web server at step s424. The web server 38 notifies the customer accordingly and returns to step s416 to receive another directory number to be associated with the toll free number. The cycle is repeated until the customer enters a directory number that is not blocked. When an override indicator has been set, the web server 38 determines that the directory number is acceptable and proceeds to step s420, storing the directory number in association with the toll-free number.

At step s426, the web server 38 receives and stores additional customized routing instructions relating to each toll-free number. For example, the customer specifies the criteria for routing calls to various POTS directory numbers. In the simplest form, the customer merely associates one POTS directory number with each toll-free number, so that calls made to the toll-free number are routed to the associated POTS directory number. Alternatively, the customer may route calls to a single toll-free number to one of multiple POTS directory numbers based on additional criteria. Examples of various routing criteria established by the customer are as follows;

Time-of-day and/or day-of-week (TOD/DOW) routing: When TOD/DOW routing is selected, the customer builds a routing schedule based on times and days of the week. The customer identifies at least one time period during which calls to a particular toll-free number are routed to a first POTS directory number, and a second time period during which the calls are routed to a second POTS directory number. For example, during known busy periods, the customer can associate each toll-free number with a separate POTS directory number; while during known slow periods, all toll-free numbers may be directed to the same POTS directory number.

Origin dependent routing: When origin dependent routing is selected, the customer builds a grid, for example, specifying the POTS directory number to which calls terminate based on the geographic origin of the call. The customer also decides the manner in which the call origin is determined. For example, the customer may select area code or NPA/NXX based call origination, in which case automatic number identification (ANI) signals, which identify the calling party number, are used to determine the area code and/or the NPA/NXX of the calling party. The customer therefore associates a call origin area code with a corresponding POTS directory number for call termination of each toll-free number. Similarly, the customer may select zip code based call origination, in which case ANI signaling may be used in combination with a database of zip codes to determine the zip code of the area in which the call originates. Alternatively, the IVR 34 may be programmed by the customer (via the web server 38) to play a series of voice announcements to a caller to have the caller enter his or her zip code during the call. Regardless of the manner in which the zip code is determined, the customer must first associate each potential call origin zip code with a corresponding POTS directory number for termination of calls to each toll-free number.

Authorization code routing: When authorization code routing is selected, the customer builds routing logic around authorization codes that are provided to callers or groups of callers. For example, authorization codes may relate to products purchased by the customer's clientele. By associating the authorization codes with selected POTS directory numbers, the customer can assure, for example, that the appropriate customer service personal are contacted regarding the corresponding products. As discussed above, the customer programs the IVR 34 (via the web server 38) to play voice announcements requesting the caller to enter his or her authorization code. In alternative embodiments, the authorization codes designate any subset of callers that may be using the same toll-free number, including caller identification or other security related measures.

Percentage allocation routing: When percentage allocation routing is selected, the customer is given the option of terminating calls to a single toll-free number to multiple POTS directory numbers based on a percentage of incoming calls. For example, the customer may designate two POTS directory numbers for a toll-free number and indicate that 50 percent of all calls to the toll-free number are routed to each of the two POTS directory numbers. The web server 38 implements various restrictions on the customer's instructions. For example, the percentage allocations must add up to 100 percent, or the web server 38 refuses to enter the customer's instructions.

Busy-ring no answer routing: When busy-ring no answer routing is selected, the customer is given the option to identify primary and secondary POTS directory numbers in association with each toll-free number. Based on this information, calls to the toll-free number are initially terminated to the primary POTS directory number. When that number is busy, or is not answered after a predetermined number of rings, the calls to the toll-free number are terminated to the secondary POTS directory number. The customer is able to customize several features for busy-ring no answer routing. For example, the customer may select the primary number, any number of secondary numbers, the order in which the secondary numbers are summoned, the number of rings that results in routing to the next secondary number and the like. In an alternative embodiment, the customer enables the busy-ring no answer functionality by identifying a primary switch ID number and/or trunk group number, along with secondary switch ID numbers and/or trunk group numbers or secondary POTS directory numbers.

After the web server 38 receives and stores the customized routing instructions from the customer relating to the toll-free numbers, it downloads the data to the CMR database server 36 at step s428. The CMR database server 36 stores the customized instructions, along with the previously stored parameters entered by the administrator, in association with the toll-free numbers. Therefore, the CMR database server 36 executes the instructions when accessed by the CMR switch 32 (e.g., step 228 of FIG. 2) for call routing instructions during real-time call processing.

Accordingly, the present invention enables a CMR platform, accessible by the PSTN, to control routing of calls to toll-free numbers based on specific parameters and customized instructions entered by the service administrator and the customer, respectively, through a web server. The customized instructions include identifying the POTS directory number and/or the switch ID and trunk group numbers to which calls to a toll-free number of the customer are to be terminated. The administrative parameters include call blocking provisions that prohibit termination of calls to the toll-free number to certain POTS directory numbers and/or switch ID and trunk group numbers, based on general contractual, regulatory or other restrictions on the service provider, the customer or both. The parameters further include a blocking override indicator, when appropriate, which indicates that the particular customer is entitled to override the general restrictions. Neither the call blocking provisions nor the blocking override indicator can be manipulated by the customer.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., SIP, TCAP, TCP/IP, HTTP, HTML, XML) and public telephone networks (e.g., AIN, SS7) represent examples of the state of the art. Such standards are periodically superseded by faster or more efficient equivalents having essentially the same functions. Accordingly, replacement standards and protocols having the same functions are considered equivalents.

What is claimed:

1. A system for operating a routing service for a plurality of customers, including a toll-free number of a customer, the system comprising:
    a platform that implements the routing service based on service data, the service data identifying a restriction associated with at least one of a service provider and one of the plurality of customers; and
    a server that communicates with the platform through a network, the server receiving at least a portion of the service data from the platform and an instruction from one of the plurality of customers relating to implementation of the routing service, the instruction associating the toll-free number with a terminating number to which calls to the toll-free number are to be routed, the server providing the instruction to the platform;
    wherein the server will not follow the instruction to associate the toll-free number with the terminating number when the terminating number is associated with the restriction associated with at least one of a service provider and one of the plurality of customers, unless the service data further includes an override indicator that overrides the restriction.

2. The system for operating the routing service according to claim 1, the restriction identifying at least one geographic area in which the customer is not authorized to receive calls to the toll-free number.

3. The system for operating the routing service according to claim 1, the server receiving the instruction from the customer through a packet switched data network, connectable to a web client of the customer.

4. The system for operating the routing service according to claim 2, the restriction further comprising a limitation on the service provider, under Section 272 of the Telecommunications Act of 1996, associated with the at least one geographic area.

5. The system for operating the routing service according to claim 4, the override indicator indicating relief from Section 272 of the Act with respect to the customer.

6. The system for operating the routing service according to claim 5, the relief being based on the customer's status as an affiliate of a regional Bell Operating Company.

7. The system for operating the routing service according to claim 2, the at least one geographic area being outside a service area to which the customer subscribes.

8. The system for operating the routing service according to claim 7, the override indicator indicating an exception to the restriction identifying the at least one geographic area.

9. The system for operating the routing service according to claim 1, further comprising a service control point connected to the platform, the service control point providing instructions to route calls to the toll-free number, through a public switched telephone network, in accordance with the service data.

10. The system for operating the routing service according to claim 1, in which the terminating number comprises a plain old telephone service directory number.

11. The system for operating the routing service according to claim 1, in which the terminating number comprises at least one of a switch identification number and a trunk group number.

12. A method for managing a call routing service for a plurality of customers, including predetermined service parameters relating to a customer, the service parameters comprising at least a toll-free number of the customer and a restriction associated with at least one of the customer and a service provider, the method comprising:
    receiving instructions from one of the plurality of customers to associate the toll-free number with a terminating number; when the restriction prohibits the association between the toll-free number and the terminating number,
    determining whether the service parameters further include an override indicator associated with one of the plurality of customers that overrides the restriction associated with at least one of the customer and a service provider; and
    associating the toll-free number with the terminating number when service parameters include the override indicator.

13. The method for managing a call routing service according to claim 12, further comprising communicating the toll-free number and the associated terminating number to a processor in a public switched telephone network to enable routing of calls placed to the toll-free number to the terminating number.

14. The method for managing a call routing service according to claim 12, in which the instructions are received from the customer through a packet switched data network.

15. The method for managing a call routing service according to claim 12, in which the restriction identifies at least one geographic area in which the customer is not authorized to terminate calls.

16. The method for managing a call routing service according to claim 15, the restriction further comprising a Section 272 of the Telecommunications Act of 1996 limitation associated with the at least one geographic area.

17. The method for managing a call routing service according to claim 16, the override indicator indicating relief from the Section 272 limitation with respect to the customer.

18. The method for managing a call routing service according to claim 17, the relief being based on the customer's status as an affiliate of a Bell Operating Company.

19. The method for managing a call routing service according to claim 15, the at least one geographic area being outside a service area to which the customer subscribes.

20. The method for managing a call routing service according to claim 19, the override indicator indicating an exception to the restriction identifying the at least one geographic area.

21. The method for managing a call routing service according to claim 12, in which the terminating number comprises a plain old telephone service directory number.

22. The method for managing a call routing service according to claim 12, in which the terminating number comprises at least one of a switch identification number and a trunk group number.

23. A method for managing a call routing service for a plurality of customers, including a toll-free number of a customer, the method comprising:
    receiving predetermined service data associated with one of the plurality of customers from a provider, the service data comprising at least the toll-free number and a restriction associated with at least one of the customer and the provider;

receiving instructions from one of the plurality of customers, via a packet switched data network, to associate the toll-free number with a terminating number;

determining whether the restriction prohibits the association between the toll-free number and the terminating number;

when the restriction prohibits the association, determining whether the service data includes an override indication, associated with one of the plurality of customers, that overrides the restriction associated with at least one of the customer and the provider;

when the service data does not include the override indication, rejecting the instructions from one of the plurality of customers; and when the service data includes the override indication, instructing a processor in a telecommunications network to route calls to the toll-free number to the terminating number.

24. The method for managing the call routing service according to claim 23, in which the restriction comprises a limitation on terminating calls to a geographic area associated with the terminating number under Section 272 of the Telecommunications Act of 1996, and in which the override indication identifies the customer as an affiliate of a Bell Operating Company.

* * * * *